United States Patent
Wang et al.

(10) Patent No.: US 12,535,119 B2
(45) Date of Patent: Jan. 27, 2026

(54) MULTI-MODAL AND MULTI-DEGREE-OF-FREEDOM PIEZOELECTRIC ACTIVE VIBRATION ISOLATION PLATFORM AND WORKING METHOD THEREFOR

(71) Applicant: NANJING UNIVERSITY OF AERONAUTICS AND ASTRONAUTICS, Nanjing (CN)

(72) Inventors: Liang Wang, Nanjing (CN); Rui Qi, Nanjing (CN); Ziyu Shen, Nanjing (CN); Jiamei Jin, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 60 days.

(21) Appl. No.: 18/747,394

(22) Filed: Jun. 18, 2024

(65) Prior Publication Data

US 2024/0418235 A1    Dec. 19, 2024

(30) Foreign Application Priority Data

Jun. 19, 2023 (CN) .......................... 202310734102.5

(51) Int. Cl.
*F16F 15/00* (2006.01)
*B06B 1/06* (2006.01)
*F16M 11/22* (2006.01)

(52) U.S. Cl.
CPC .......... *F16F 15/007* (2013.01); *B06B 1/0603* (2013.01); *F16F 15/002* (2013.01); *F16M 11/22* (2013.01); *B06B 2201/30* (2013.01); *F16F 2224/0283* (2013.01); *F16F 2228/066* (2013.01); *F16F 2230/18* (2013.01)

(58) Field of Classification Search
CPC .................. F16F 15/007; F16F 15/002; F16F 2224/0283; F16F 2228/066; F16F 2230/18; B06B 1/0603; B06B 2201/30; F16M 11/22
USPC ........................................................ 248/550
See application file for complete search history.

(56) References Cited

U.S. PATENT DOCUMENTS

| | | | | |
|---|---|---|---|---|
| 6,378,672 B1 * | 4/2002 | Wakui | ..................... | G03F 7/709 267/140.14 |
| 8,899,393 B2 * | 12/2014 | Kraner | ................. | G05B 19/404 188/380 |
| 10,488,300 B2 * | 11/2019 | Kobayashi | .............. | G01M 7/02 |

* cited by examiner

*Primary Examiner* — Anita M King
(74) *Attorney, Agent, or Firm* — Treasure IP group, LLC (57) ABSTRACT

Disclosed is a multi-modal and multi-degree-of-freedom piezoelectric active vibration isolation platform and a working method therefor. The piezoelectric active vibration isolation platform includes an upper platform, a lower platform, a control module, and four vibration isolation modules, where the vibration isolation module includes a passive vibration isolation unit and an active vibration isolation unit; the passive vibration isolation unit includes an upper connector, a lower connector, a cross Hooke hinge, and a first acceleration sensor; the active vibration isolation unit includes a fixed beam, a pre-tightening bolt, a second acceleration sensor, and a driving component; the platform can provide active vibration isolation for the longitudinal (axial) vibration and the bending vibration in any radial direction of a vibration isolation object, and has the advantages of fast response, resistance to electromagnetic interference, and light weight.

3 Claims, 5 Drawing Sheets

MULTI-MODAL AND MULTI-DEGREE-OF-FREEDOM PIEZOELECTRIC ACTIVE VIBRATION ISOLATION PLATFORM AND WORKING METHOD THEREFOR

CROSS-REFERENCE OF RELATED APPLICATIONS

The application claims priority from Chinese Patent Application No. 202310734102.5, filed Jun. 19, 2023, which is incorporated herein by reference in its entirety.

TECHNICAL FIELD

The present application relates to the field of piezoelectric driving and mechanical vibration control, and particularly relates to a multi-modal and multi-degree-of-freedom piezoelectric active vibration isolation platform and the working method therefor.

BACKGROUND

Active vibration isolation platforms are widely used in the fields of aerospace, engineering machinery, mechanical transmission and the like, which can reduce the vibration amplitude of vibration isolation objects. Meanwhile, piezoelectric materials have the advantages of fast response, resistance to electromagnetic interference, high precision, and light weight, and are suitable for the active vibration isolation platforms. However, due to the heavy weight, complex structure, slow response, high hysteresis, and difficulty in meeting vibration isolation for multi-degree-of-freedom vibration of the traditional active vibration isolation platforms, the traditional active vibration isolation platforms are limited in application, poor in vibration isolation effect, and not suitable for multi-degree-of-freedom vibration. Therefore, developing an active vibration isolation platform with light weight, compact structure and fast response has become an important research direction, and meeting the vibration isolation for the multi-degree-of-freedom vibration and multi-modal vibration has become a main problem to be solved urgently in this field.

SUMMARY OF THE INVENTION

A technical problem to be solved by the present application is to provide a spacecraft vibration suppression structure and method based on piezoelectric composite materials in view of defects involved in the background.

To solve the above technical problems, the present application adopts the technical solution as follows:

A multi-modal and multi-degree-of-freedom piezoelectric active vibration isolation platform includes an upper platform, a lower platform, first to fourth vibration isolation modules, and a control module, wherein
the first to fourth vibration isolation modules have the same structure, and each includes a passive vibration isolation unit and an active vibration isolation unit;
the passive vibration isolation unit includes an upper connector, a lower connector, a cross Hooke hinge, and a first acceleration sensor, where the upper connector and the lower connector are regular quadrangular prisms with the same cross-sectional shape, each includes first to fourth side walls perpendicularly and fixedly connected end to end in sequence; two ends of the cross Hooke hinge are separately connected with a lower end face of the first acceleration sensor and an upper end face of the lower connector, so that the first to fourth side walls of the upper connector and the lower connector are coplanar one by one, and two rotating shafts of the cross Hooke hinge are separately perpendicular to the first side wall and the second side wall of the upper connector; a threaded blind hole is provided in the center of a lower end face of the lower connector; the first acceleration sensor is arranged on an end face of the upper connector, connected in series with the upper connector and the upper platform, and configured to sense a vibration signal of the upper platform; the passive vibration isolation unit includes the Hooke hinge, which can generate bending deformation in any radial direction, and play a passive vibration isolation effect in high frequency disturbance. Relying on the structure of the Hooke hinge, the passive vibration isolation unit has the characteristic of reducing stiffness, and plays a passive vibration isolation effect, especially in frequency bands with high disturbance frequency.

The active vibration isolation unit includes a fixed beam, a pre-tightening bolt, a second acceleration sensor, and a driving component; the fixed beam and the lower connector are regular quadrangular prisms with the same cross-sectional shape, and a countersunk through hole through which the pre-tightening bolt penetrates is provided in the center of a lower end face of the fixed beam; through the inverse piezoelectric effect of the driving component, the active vibration isolation unit is actuated, and generates elongation or contraction deformation in an axial direction; the driving component includes 2N piezoelectric ceramic plates, and N is a natural number greater than or equal to 1; the shape of the piezoelectric ceramic plate is the same as the cross-sectional shape of the lower connector, and a through hole through which the pre-tightening bolt penetrates is provided in the center of the piezoelectric ceramic plate; the pre-tightening bolt sequentially penetrates through the fixed beam and the 2N piezoelectric ceramic plates and is then in threaded connection with the threaded blind hole on the lower end face of the lower connector, to tightly clamp the 2N piezoelectric ceramic plates between the fixed beam and the lower connector; the 2N piezoelectric ceramic plates are polarized along a thickness direction thereof, and polarization directions of the adjacent piezoelectric ceramic plates are opposite; the surface of the piezoelectric ceramic plate adjacent to the fixed beam and the lower connector is grounded, to ensure safety during use; a wiring mode of the driving component is: grounding (the surface adjacent to the lower connector), control signal, grounding, control signal, . . . , grounding (the surface adjacent to the fixed beam); the arrangement of the above piezoelectric ceramic plates is favorable for applying control signals thereof; with the application of the control signals, these driving components can generate elongation or contraction deformation in the axial direction, that is, longitudinal vibration in the axial direction; the second acceleration sensor is arranged in an inner hole of the fixed beam, and configured to sense a vibration signal of the fixed beam. The active vibration isolation unit is actuated by piezoelectric, so that the structure isolates disturbance through active control, particularly when the disturbance frequency is low, the active vibration isolation unit can play a better vibration isolation effect. Particularly, due to the combination of the passive vibration isolation unit and the active vibration isolation unit, the structure can meet vibration isolation for wider frequency band disturbance.

The upper platform and the lower platform are both square flat plates, the upper platform is configured to be fixedly connected with a vibration isolation object, and the lower platform is configured to be fixedly connected with a vibration source needing to be fixed to the vibration isolation object.

An array of the first to fourth vibration isolation modules is between the upper platform and the lower platform, upper end faces of the upper connectors of the first to fourth vibration isolation modules are all fixedly connected with the upper platform, and the lower end faces of the fixed beams are all fixedly connected with the lower platform, so that the first side walls of the upper connectors in the first and second vibration isolation modules are coplanar, the first side walls of the upper connectors in the third and fourth vibration isolation modules are coplanar, and the first side walls of the upper connectors in the first and third vibration isolation modules are parallel; the array of the above vibration isolation modules enhances a control force for axial longitudinal vibration, and improves a vibration control effect for axial longitudinal disturbance, meanwhile, the array of the four vibration isolation modules provides the feasibility of bending vibration, the control signals applied to the four vibration isolation modules are different, and the vibration isolation platform can meet the control on bending vibration in any radial direction.

The control modules used in the above solution are conventional control modules that can be applied to the field of vibration control or commercial (commercially available) control modules. The control module is electrically connected with the first acceleration sensors, the second acceleration sensors, and the driving components in the first to fourth vibration isolation modules separately; the control module inputs sensed data of the first acceleration sensors and the second acceleration sensors in the first to fourth vibration isolation modules, and obtains control signals for controlling the driving components through calculation, and the control signals are output and applied to the driving components of the first to fourth vibration isolation modules; the driving components are actuated after the control signals are applied, and the first to fourth vibration isolation modules separately generate longitudinal vibration in the axial direction; and with the longitudinal vibration of the four vibration isolation modules, the vibration isolation platform generates axial longitudinal vibration in the axial direction or bending vibration through a coupling effect; the vibration generated by the vibration isolation platform has an opposite direction and equal amplitude to the disturbance vibration, which plays a vibration isolation effect using a superposition principle.

In the present application, the term "multi-modal" refers to a longitudinal vibration modality and a bending vibration modality. The term "multi-degree-of-freedom" refers to the disturbance vibration isolation in different directions, such as an axial direction (that is, a normal direction of the plane of the vibration isolation platform) of longitudinal vibration and a deformation direction (that is, any radial direction, any direction in the plane of the vibration isolation platform) of bending vibration. The term "active vibration isolation" refers to a vibration isolation mode that adopts an active control method to actuate the platform with the input of external energy.

The upper platform involved in an embodiment of the present application is further provided with a plurality of bolt holes configured to be connected with the vibration isolation object.

At least one embodiment of the present application further discloses a working method using the multi-modal and multi-degree-of-freedom piezoelectric active vibration isolation platform, including the following steps in the detail description section.

Compared with the prior art, the technical solution disclosed by the embodiments of the present application has the following technical effects:

1. The piezoelectric active vibration isolation platform disclosed by the embodiments of the present application adopts a sandwich piezoelectric transducer configuration, and has the advantages of compact structure, high performance, rapid system response, resistance to electromagnetic interference and high active vibration isolation effect.

2. The piezoelectric active vibration isolation platform disclosed by the embodiments of the present application adopts piezoelectric materials, meets the multi-modal active vibration isolation for a longitudinal vibration modality and a bending vibration modality, and meanwhile can effectively isolate the multi-degree-of-freedom vibration of axial longitudinal vibration and bending vibration in any axial direction.

BRIEF DESCRIPTION OF DRAWINGS

FIG. 7 is the schematic diagrams of deformation comparison of an active vibration isolation working modality of a piezoelectric active vibration isolation platform for bending vibration in four typical directions; where A and B are schematic diagrams of a signal applying mode and a vibration control principle of bending vibration in X direction separately; C and D are schematic diagrams of a signal applying mode and a vibration control principle of bending vibration in Y direction separately; E and F are schematic diagrams of a signal applying mode and a vibration control principle of bending vibration in a 45-degree direction of X plane separately; and G and H are schematic diagrams of a signal applying mode and a vibration control principle of bending vibration in a 135-degree direction of XY plane separately.

In the figures, 1—upper platform, 2—third vibration isolation module, 3—lower platform, 4—passive vibration isolation unit, 5—active vibration isolation unit, 6—first acceleration sensor, 7—cross Hooke hinge, 8—driving component, 9—piezoelectric ceramic plate, 10—upper connector, 11—pre—tightening bolt, 12—fixed beam, and 13—second acceleration sensor.

DETAILED DESCRIPTION

The technical solution of the present application will be further described in detail below in combination with the accompanying drawings:

The technical solution of the present application can be implemented in many different forms and should not be considered as limited to the embodiments described herein. Instead, these embodiments are provided to make the present application thorough and complete, and will adequately express the scope of the present application to those skilled in the art. In the drawings, components are enlarged for clarity.

Embodiment 1

Figure 1:
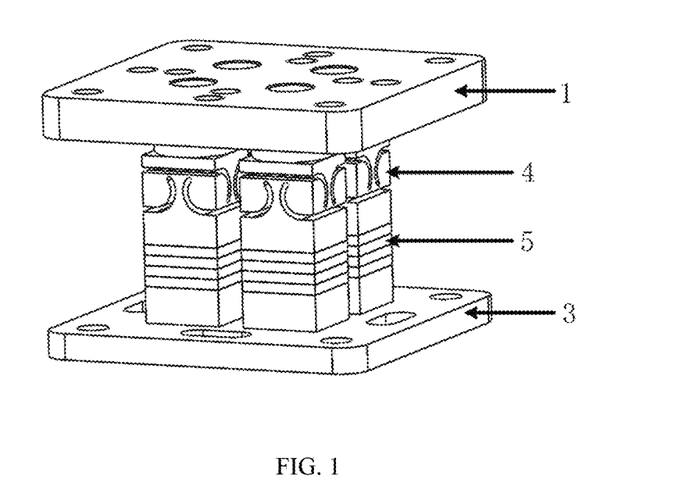
FIG. 1 is a schematic structural diagram of a piezoelectric active vibration isolation platform in an embodiment.

As shown in FIG. 1, this embodiment relates to a multimodal and multi-degree-of-freedom piezoelectric active vibration isolation platform, including an upper platform, a lower platform, first to fourth vibration isolation modules, and a control module. The above first to fourth vibration isolation modules have the same structure, and each includes a passive vibration isolation unit and an active vibration isolation unit.

Figure 2:
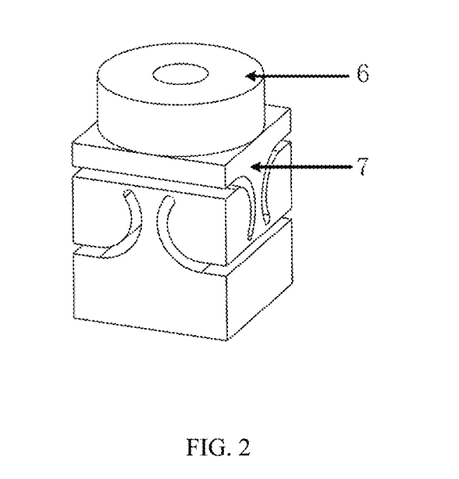
FIG. 2 is a schematic structural diagram of a passive vibration isolation unit of a piezoelectric active vibration isolation platform in an embodiment.

As shown in FIG. 2, the passive vibration isolation unit includes an upper connector, a lower connector, a cross Hooke hinge, and a first acceleration sensor, where the upper connector and the lower connector are regular quadrangular prisms with the same cross-sectional shape, each includes first to fourth side walls perpendicularly and fixedly connected end to end in sequence; two ends of the cross Hooke hinge are connected with a lower end face of the first acceleration sensor and an upper end face of the lower connector separately, so that the first to fourth side walls of the upper connector and the lower connector are coplanar one by one, and two rotating shafts of the cross Hooke hinge are perpendicular to the first side wall and the second side wall of the upper connector separately; a threaded blind hole is provided in the center of a lower end face of the lower connector; the first acceleration sensor is arranged on an end face of the upper connector, connected in series with the upper connector and the upper platform, and configured to sense a vibration signal of the upper platform.

Figure 3:
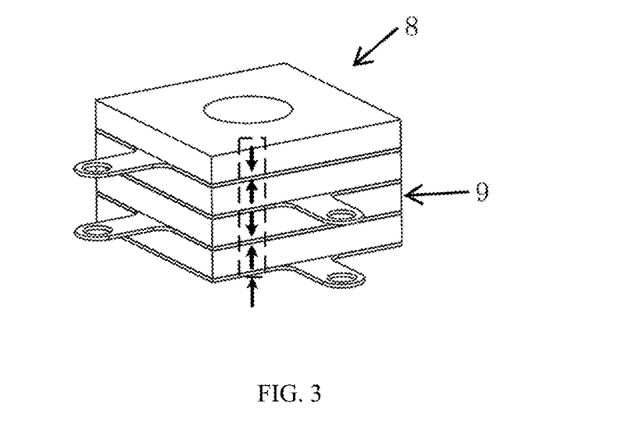
FIG. 3 is a schematic structural diagram of a driving component in an active vibration isolation unit of a piezoelectric active vibration isolation platform in an embodiment.

The active vibration isolation unit includes a fixed beam, a pre-tightening bolt, a second acceleration sensor, and a driving component; the fixed beam and the lower connector are regular quadrangular prisms with the same cross-sectional shape, and a countersunk through hole through which the pre-tightening bolt penetrates is provided in the center of a lower end face of the fixed beam; as shown in FIG. 3, the driving component includes 2N piezoelectric ceramic plates, and N is a natural number greater than or equal to 1; the shape of the piezoelectric ceramic plate is the same as the cross-sectional shape of the lower connector, and a through hole through which the pre-tightening bolt penetrates is provided in the center of the piezoelectric ceramic plate; the pre-tightening bolt sequentially penetrates through the fixed beam and the 2N piezoelectric ceramic plates and is then in threaded connection with the threaded blind hole on the lower end face of the lower connector, to tightly clamp the 2N piezoelectric ceramic plates between the fixed beam and the lower connector; the 2N piezoelectric ceramic plates are polarized along a thickness direction thereof, and polarization directions of the adjacent piezoelectric ceramic plates are opposite; the second acceleration sensor is arranged in an inner hole of the fixed beam, and configured to sense a vibration signal of the fixed beam.

The upper platform and the lower platform are both square flat plates, the upper platform is configured to be fixedly connected with a vibration isolation object, and the lower platform is configured to be fixedly connected with a vibration source needing to be fixed to the vibration isolation object.

An array of the first to fourth vibration isolation modules is between the upper platform and the lower platform, upper end faces of the upper connectors of the first to fourth vibration isolation modules are all fixedly connected with the upper platform, and the lower end faces of the fixed beams are all fixedly connected with the lower platform, so that the first side walls of the upper connectors in the first and second vibration isolation modules are coplanar, the first side walls of the upper connectors in the third and fourth vibration isolation modules are coplanar, and the first side walls of the upper connectors in the first and third vibration isolation modules are parallel.

The control module is electrically connected with the first acceleration sensors, the second acceleration sensors, and the driving components in the first to fourth vibration isolation modules separately, and is configured to control the driving components in the first to fourth vibration isolation modules to work according to sensed data of the first acceleration sensors and the second acceleration sensors in the first to fourth vibration isolation modules.

Figure 4:
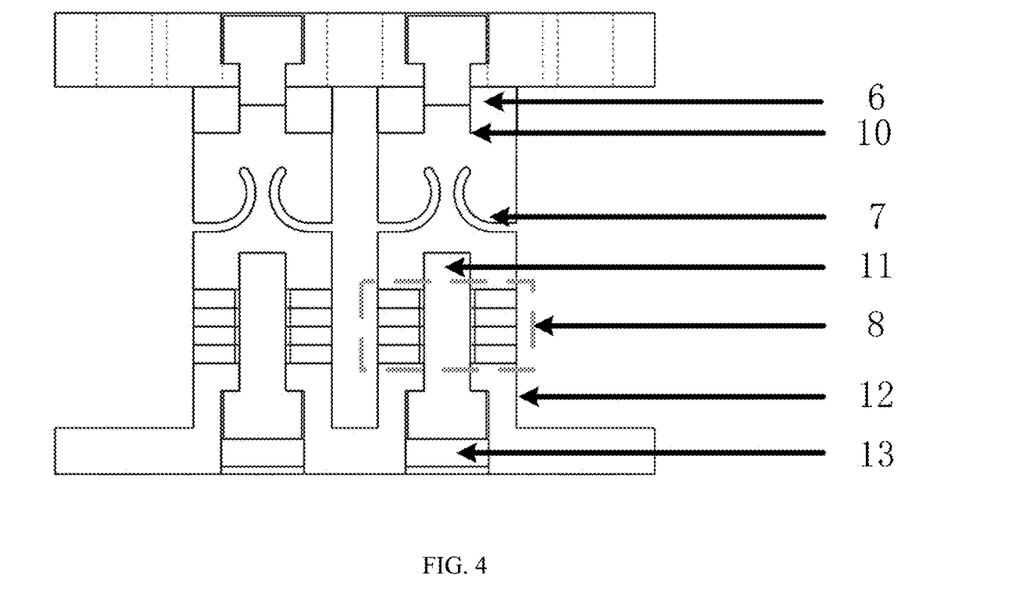
FIG. 4 is a structural cutaway view of a piezoelectric active vibration isolation platform in an embodiment.

As shown in FIG. 4, the upper platform is provided with a plurality of bolt holes configured to be connected with the vibration isolation object.

The acceleration sensors in the first to fourth vibration isolation modules generate vibration signals corresponding to disturbance of the vibration source, and the vibration signals have the same frequency and phase as vibration at a location of the vibration isolation module, and have the amplitude positively correlated with the intensity of the vibration at the location of the vibration isolation module. If the vibration signals generated by the acceleration sensors in the first to fourth vibration isolation modules have the equal amplitude, it means that the vibration isolation object is in a longitudinal vibration modality. If two of the vibration signals generated by the acceleration sensors in the first to the fourth vibration isolation modules have a phase difference of 180 degrees, it means that the vibration isolation object is in a bending vibration modality.

Figure 5:
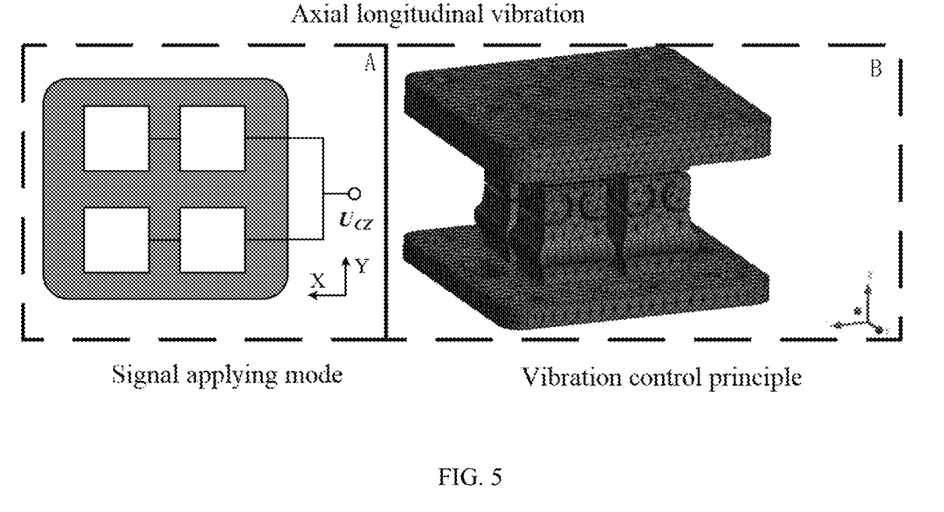
FIG. 5 is the schematic diagrams of the deformation comparison of an active vibration isolation working modality of a piezoelectric active vibration isolation platform for longitudinal vibration in an embodiment.
Figure 6:
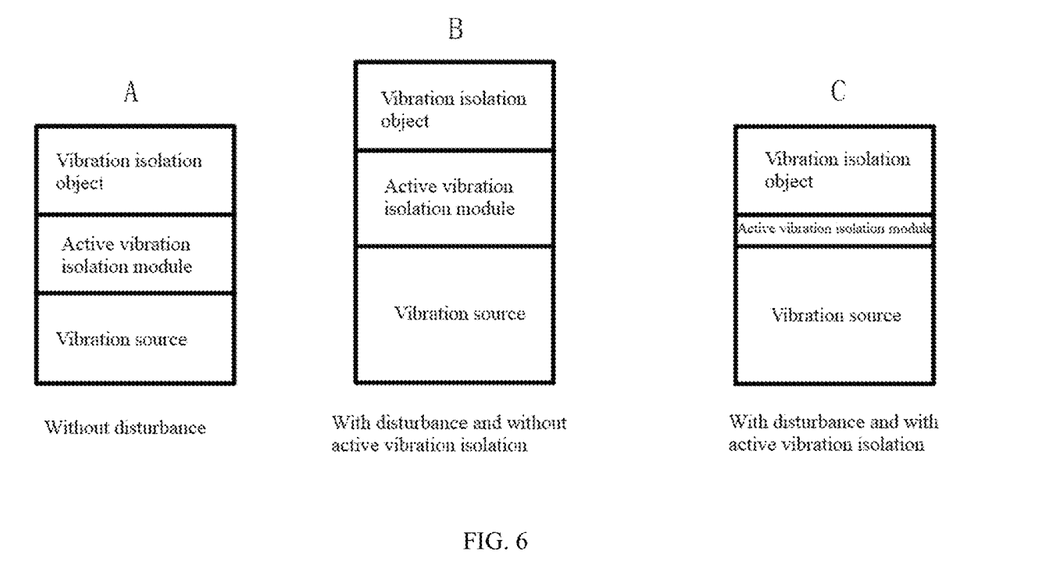
FIG. 6 is the schematic diagrams of a principle of a piezoelectric active vibration isolation platform in an embodiment, where A-C are schematic diagrams of comparison of the piezoelectric active vibration isolation platform without disturbance, without active vibration isolation for longitudinal vibration and with active vibration isolation for longitudinal vibration separately.

FIG. 5 is a schematic diagram for longitudinal vibration. In FIG. 5. Ucz is used for indicating that electric signals applied to the four active vibration isolation modules are the same, A is a signal applying mode and B is a vibration deformation diagram, that is, a vibration mode diagram. A principle of active vibration isolation is to introduce secondary vibration through the vibration isolation platform, and the secondary vibration and vibration of the vibration source maintain opposite phases, consistent frequency, and the equal amplitude, that is, the secondary vibration and the vibration of the vibration source cancel each other. The principle is shown in FIG. 6. FIG. 6 shows that a vibration isolation effect of the platform of this embodiment is that the vibration isolation object is basically in the same state compared with an undisturbed state, and the effect of disturbance is reduced by vibration isolation.

Figure 7:
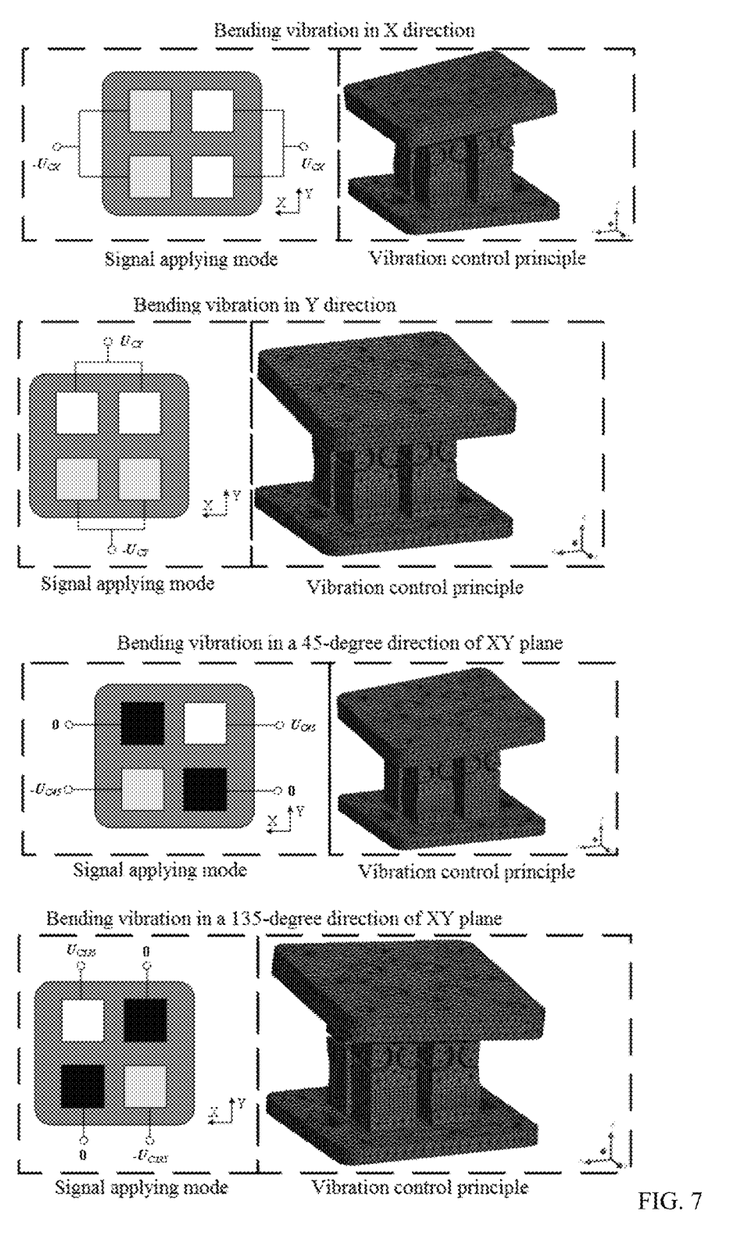

For bending vibration, the principle of active vibration isolation is that bending deformation generated in the present application can achieve a vibration isolation effect. The piezoelectric active vibration isolation platform can generate bending vibration in any radial direction, and a vibration mode diagram of bending vibration of the piezoelectric active vibration isolation platform is shown in FIG. 7, the typical directions are X direction, Y direction, a 45-degree axis direction of XY plane and a 135-degree axis direction of XY plane separately.

Figure 8:
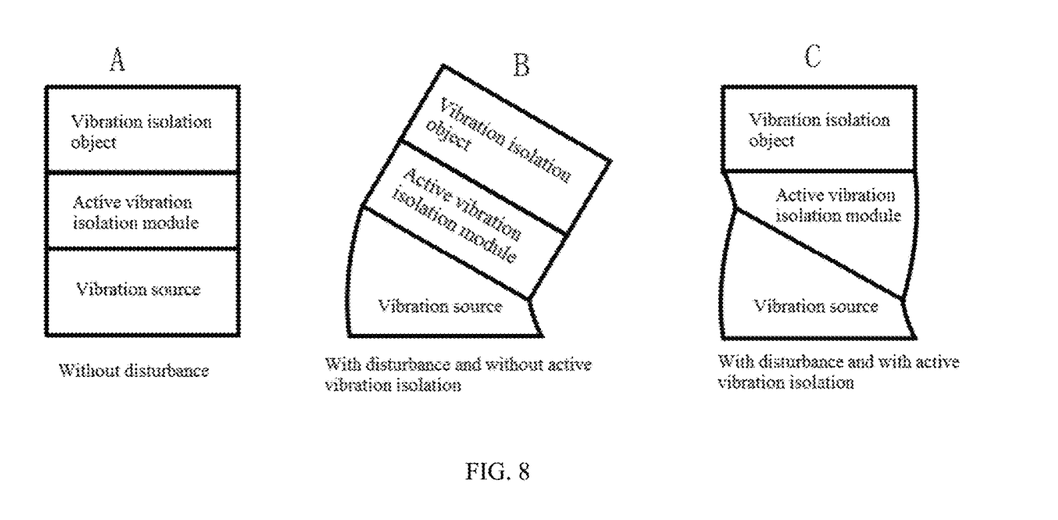
FIG. 8 is the schematic diagrams of vibration isolation of a piezoelectric active vibration isolation platform in an embodiment, where A-C are schematic diagrams of comparison of the piezoelectric active vibration isolation platform without disturbance, without active vibration isolation for bending vibration and with active vibration isolation for bending vibration separately.

Bending deformation generated by the vibration isolation platform provided in this embodiment and deformation of the vibration source cancel each other, the vibration isolation effect is achieved through a vibration amplitude isolation principle, and a schematic diagram of the deformation of the vibration isolation platform is shown in FIG. 8.

Specific working steps of the above piezoelectric active vibration isolation platform provided in this embodiment are as follows:

1) As shown in FIG. 5, when disturbance causes the vibration isolation object to generate a longitudinal vibration modality in an axial direction (that is, a normal direction of the plane of the vibration isolation platform), the working steps of each vibration isolation module of the first to fourth vibration isolation modules in the piezoelectric active vibration isolation platform are as follows:

Step 1.1), methods for identifying vibration modalities and directions: if the sensing signals of the four first acceleration sensors have the same direction and equal amplitude, it indicates that the upper platform (vibration isolation object) generates longitudinal vibration; if the sensing signals of the four second acceleration sensors have the same direction and equal amplitude, it indicates that the vibration source is in longitudinal vibration; the vibration direction of the upper platform (the vibration isolation object) is the axial direction, and is the same as the direction of the first acceleration sensor; and the vibration direction of disturbance vibration is the axial direction, and is same as the direction of the second acceleration sensor.

Step 1.2), the second acceleration sensor measures a sensing signal for disturbance, and inputs the sensing signal into the control module; and the first acceleration sensor measures a sensing signal for vibration of the upper platform (that is, the vibration isolation object), and inputs the sensing signal into the control module.

Step 1.3), through calculation of the control module, (here, take a commonly used composite control module of proportional feedforward and acceleration feedback as an example), the sensing signals measured by the first acceleration sensor and the second acceleration sensor are separately multiplied by a corresponding proportional coefficient K through a proportional operation, and then superimposed to output.

Step 1.4), the control module performs gain amplification on a calculated electric signal via a power amplifier, to obtain a control signal for the driving component.

Step 1.5), the control signal is applied into the driving component in the vibration isolation module, the driving component generates corresponding elongation or contraction deformation, and plays a vibration isolation effect through a vibration amplitude isolation principle in a vibration isolation principle; the specific principle is as shown in FIG. 6: when the disturbance vibration source generates upward displacement xa, the piezoelectric active vibration isolation platform generates contraction deformation xa through the driving component, and the displacement xa of the disturbance vibration source is equal to the contraction deformation displacement xa of the piezoelectric active vibration isolation platform; when the disturbance vibration source generates downward displacement, the piezoelectric active vibration isolation platform generates elongation deformation through the driving component, and the displacement of the disturbance vibration source is equal to the elongation deformation displacement of the piezoelectric active vibration isolation platform.

Step 1.6), the driving component generates secondary longitudinal vibration of the elongation or contraction deformation, which has an opposite direction and equal amplitude to the longitudinal vibration of the disturbance vibration source; the four active vibration isolation modules have the same longitudinal vibration direction and amplitude, and play the vibration isolation effect through the vibration amplitude isolation principle.

Step 1.7), when the sensing signal of the second acceleration sensor reaches a minimum value and approaches zero, the vibration isolation effect is realized.

2) As shown in FIG. 7, When the disturbance causes the vibration isolation object to generate a bending vibration modality in any radial direction (any radial direction, that is, any direction in the plane of the vibration isolation platform), the working steps of each vibration isolation module of the first to fourth vibration isolation modules in the piezoelectric active vibration isolation platform are as follows:

Step 2.1), a method for identifying vibration modalities: if the sensing signals of the four first acceleration sensors have different directions, but at least two sensing signals have opposite directions, and at least two sensing signals have the equal amplitude, it indicates that the upper platform (vibration isolation object) generates a bending vibration modality; if the sensing signals of the four second acceleration sensors have different directions, but at least two sensing signals have opposite directions, and at least two sensing signals have the equal amplitude, it indicates that the disturbance vibration source is in a bending vibration modality.

Step 2.2), a method for identifying vibration directions: because at least two sensing signals of the sensing signals of the four first acceleration sensors have opposite directions, when only two sensing signals have opposite directions, the direction of a connection line of the locations of the corresponding first acceleration sensors is the vibration direction of the upper platform (the vibration isolation object) and points to a side where the sensing signal is negative (as shown in schematic diagrams of bending vibration in a 45-degree direction of XY plane and bending vibration in a 135-degree direction of XY plane in FIG. 7); when two sensing signals have the same direction and two sensor signals have opposite directions, the direction of a connection line between a symmetry point of the sensors with the same sensing signals and a symmetry point of the sensors with opposite sensing signals is the vibration direction of the upper platform (the vibration isolation object) and points to a side where the sensing signal is negative (as shown in the schematic diagrams of X direction bending vibration and Y direction bending vibration in FIG. 7).

Because at least two sensing signals of the sensing signals of the four second acceleration sensors have opposite directions, when only two sensing signals have opposite directions, the direction of the connection line of the locations of the corresponding second acceleration sensors is the vibration direction of disturbance vibration and points to the side where the sensing signal is negative (as shown in the schematic diagrams of bending vibration in a 45-degree of XY plane and bending vibration in a 135-degree of XY plane in FIG. 7); when two sensing signals have the same direction and two sensor signals have opposite directions, the direction of the connection line between the symmetry point of the sensors with the same sensing signals and the symmetry point of the sensors with opposite sensing signals is the vibration direction of the disturbance vibration and points to the side where the sensing signal is negative (as shown in the schematic diagram of X direction bending vibration and Y direction bending vibration in FIG. 7).

Step 2.3), the second acceleration sensor measures a sensing signal for disturbance, and inputs the sensing signal into the control module; and the first acceleration sensor measures a sensing signal for vibration of the upper platform (that is, the vibration isolation object), and inputs the sensing signal into the control module.

Figure 9:
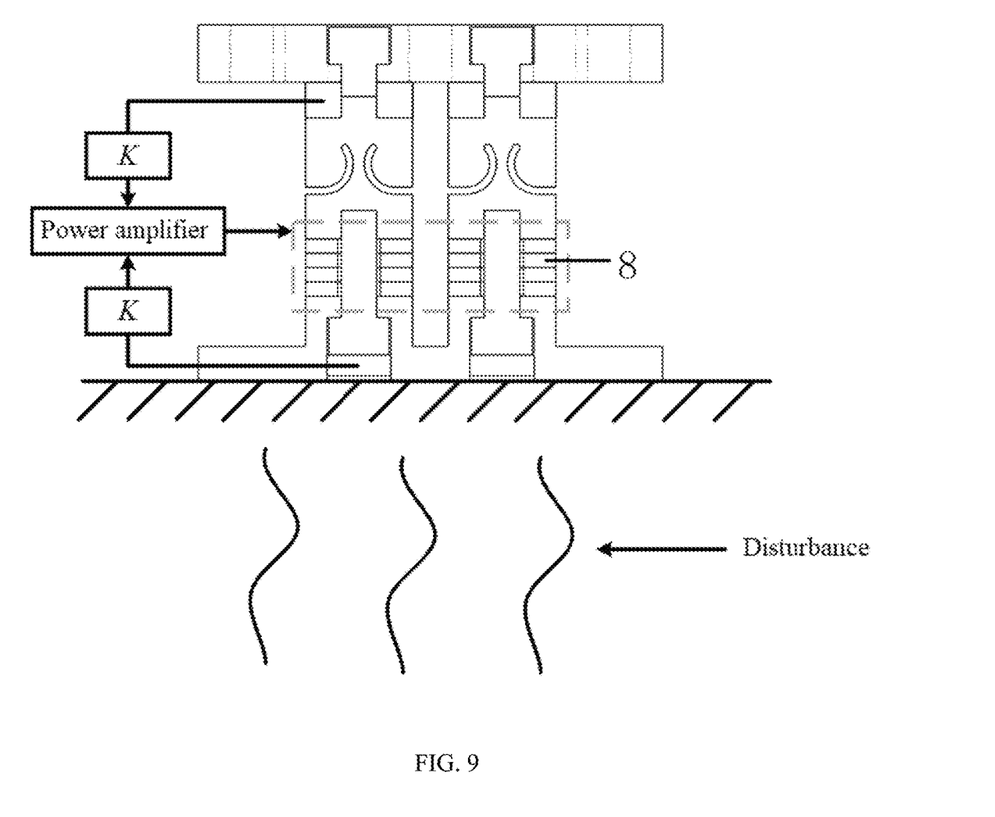
FIG. 9 is a schematic diagram of an architecture of a control module of a piezoelectric active vibration isolation platform in an embodiment.

Step 2.4), through calculation of the control module, (here, take a commonly used composite control module of proportional feedforward and acceleration feedback as an example, as shown in FIG. 9), the sensing signals measured by the first acceleration sensor and the second acceleration sensor are separately multiplied by a corresponding proportional coefficient K through a proportional link, and then superimposed to output.

Step 2.5), the control module performs gain amplification on a calculated electric signal via a power amplifier, to obtain a control signal for the driving component.

Step 2.6), the control signal is applied into the driving component in the vibration isolation module, the driving component of each vibration isolation module generates secondary longitudinal vibration of elongation or contraction deformation.

Step 2.7), because the secondary longitudinal vibration generated by the four vibration isolation modules has different directions and amplitudes, secondary bending vibration with an opposite direction and equal amplitude to the disturbance vibration is generated on the upper platform through the connection and coupling of the upper platform; taking the disturbance vibration in X direction as an example, the direction of the disturbance vibration is bending vibration in X direction, the driving component in the vibration isolation module generates secondary longitudinal vibration, the four vibration isolation modules are symmetrical about Y axis, secondary vibrations generated by the two vibration isolation modules on the same side of Y axis have the same direction, that is, elongation deformation is generated on one side of Y axis and contraction deformation is generated on the other side, so that secondary bending vibration in X direction is obtained through coupling on the upper platform, and the secondary bending vibration has an opposite direction and equal amplitude to the disturbance bending vibration.

Step 2.8), when the sensing signal of the second acceleration sensor reaches a minimum value and approaches zero, the vibration isolation effect is realized.

Finally, the active vibration isolation unit in the vibration isolation module generates secondary vibration with the same frequency and amplitude, and the opposite phase as vibration at the location to cancel the vibration of the vibration source.

It can be understood by those skilled in the art that unless otherwise defined, all terms (including technical terms and scientific terms) used herein have the same meaning as commonly understood by those skilled in the art of the present application. It should also be understood that terms such as those defined in general dictionaries should be understood to have meanings consistent with those in the context of the prior art, and unless defined as here, will not be interpreted with idealized or overly formal meanings.

The specific implementations mentioned above further explain the objective, technical solutions, and beneficial effects of the present application in detail. It should be understood that the above embodiments are only specific implementations of the present application, and are not intended to limit the present application. Any modifications, equivalent replacements, improvements, etc. made within the spirit and principles of the present application should be included in the scope of the present application.

The invention claimed is:

1. A multi-modal and multi-degree-of-freedom piezoelectric active vibration isolation platform, comprising an upper platform, a lower platform, first to fourth vibration isolation modules, and a control module, wherein the first to fourth vibration isolation modules have a same structure, and each comprises a passive vibration isolation unit and an active vibration isolation unit;

the passive vibration isolation unit comprises an upper connector, a lower connector, a cross Hooke hinge, and a first acceleration sensor, wherein the upper connector and the lower connector are regular quadrangular prisms with the same cross-sectional shape, each comprises first to fourth side walls perpendicularly and fixedly connected end to end in sequence; two ends of the cross Hooke hinge are separately connected with a lower end face of the first acceleration sensor and an upper end face of the lower connector, so that the first to fourth side walls of the upper connector and the lower connector are coplanar one by one, and two rotating shafts of the cross Hooke hinge are separately perpendicular to the first side wall and the second side wall of the upper connector; a threaded blind hole is provided in the center of a lower end face of the lower connector; the first acceleration sensor is arranged on an end face of the upper connector, connected in series with the upper connector and the upper platform, and configured to sense a vibration signal of the upper platform;

the active vibration isolation unit comprises a fixed beam, a pre-tightening bolt, a second acceleration sensor, and a driving component; the fixed beam and the lower connector are regular quadrangular prisms with the same cross-sectional shape, and a countersunk through hole through which the pre-tightening bolt penetrates is provided in the center of a lower end face of the fixed beam; the driving component comprises 2N piezoelectric ceramic plates, and N is a natural number greater than or equal to 1; the shape of the piezoelectric ceramic plate is the same as the cross-sectional shape of the lower connector, and a through hole through which the pre-tightening bolt penetrates is provided in the center of the piezoelectric ceramic plate; the pre-tightening bolt sequentially penetrates through the fixed beam and the 2N piezoelectric ceramic plates, and is then in threaded connection with the threaded blind hole on the lower end face of the lower connector, to tightly clamp the 2N piezoelectric ceramic plates between the fixed beam and the lower connector; the 2N piezoelectric ceramic plates are polarized along a thickness direction thereof, and polarization directions of the adjacent piezoelectric ceramic plates are opposite; the second acceleration sensor is arranged in an inner hole of the fixed beam, and configured to sense a vibration signal of the fixed beam;

the upper platform and the lower platform are both square flat plates, the upper platform is configured to be fixedly connected with a vibration isolation object, and the lower platform is configured to be fixedly connected with a vibration source needing to be fixed to the vibration isolation object;

an array of the first to fourth vibration isolation modules is between the upper platform and the lower platform, upper end faces of the upper connectors of the first to fourth vibration isolation modules are all fixedly connected with the upper platform, and the lower end faces of the fixed beams are all fixedly connected with the lower platform, so that the first side walls of the upper connectors in the first and second vibration isolation modules are coplanar, the first side walls of the upper connectors in the third and fourth vibration isolation modules are coplanar, and the first side walls of the upper connectors in the first and third vibration isolation modules are parallel; and the control module is electrically connected with the first acceleration sensors, the second acceleration sensors, and the driving components in the first to fourth vibration isolation modules separately, and is configured to control the driving components in the first to fourth vibration isolation modules to work according to sensed data of the first acceleration sensors and the second acceleration sensors in the first to fourth vibration isolation modules.

2. The multi-modal and multi-degree-of-freedom piezoelectric active vibration isolation platform according to claim 1, wherein the upper platform is provided with a plurality of bolt holes configured to be connected with the vibration isolation object.

3. A working method of the multi-modal and multi-degree-of-freedom piezoelectric active vibration isolation platform according to claim 1, comprising the following steps:

for each vibration isolation module of the first to fourth vibration isolation modules:

step 1), collecting, by the control module, a vibration signal A generated by the second acceleration sensor in the vibration isolation module;

step 2), filtering, by the control module, the vibration signal A to stabilize the same, then adjusting a filtered vibration signal, to make the phase of the filtered vibration signal opposite to the original phase, and obtaining a vibration isolation signal B;

step 3), using, by the control module, the vibration isolation signal B as a driving signal for the driving component of the active vibration isolation unit in the vibration isolation module, and driving the active vibration isolation unit of the vibration isolation module to work through the driving signal; and step 4), collecting, by the control module, a vibration signal C generated by the first acceleration sensor in the vibration isolation module, determining whether the amplitude of the vibration signal C is greater than or equal to a preset maximum amplitude threshold, and in a case that the amplitude of the vibration signal C is greater than or equal to the preset maximum amplitude threshold, amplifying, by the control module, the vibration isolation signal B, so that the amplitude of the vibration isolation signal B is equal to the original amplitude plus a preset step amplitude threshold, and then skipping performing step 3).

* * * * *